Sept. 22, 1936.   E. E. HEWITT   2,055,103
GASKET AND METHOD OF MAKING
Filed June 11, 1932   2 Sheets-Sheet 1

INVENTOR.
ELLIS E. HEWITT
By *Wm. M. Cady*
ATTORNEY.

Sept. 22, 1936.　　　　E. E. HEWITT　　　　2,055,103
GASKET AND METHOD OF MAKING
Filed June 11, 1932　　　2 Sheets-Sheet 2
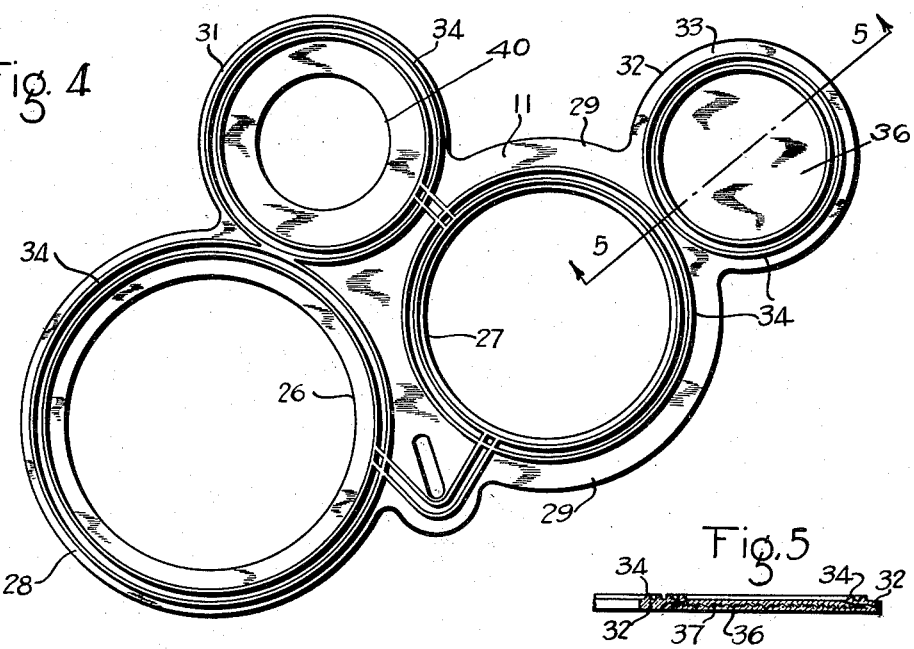
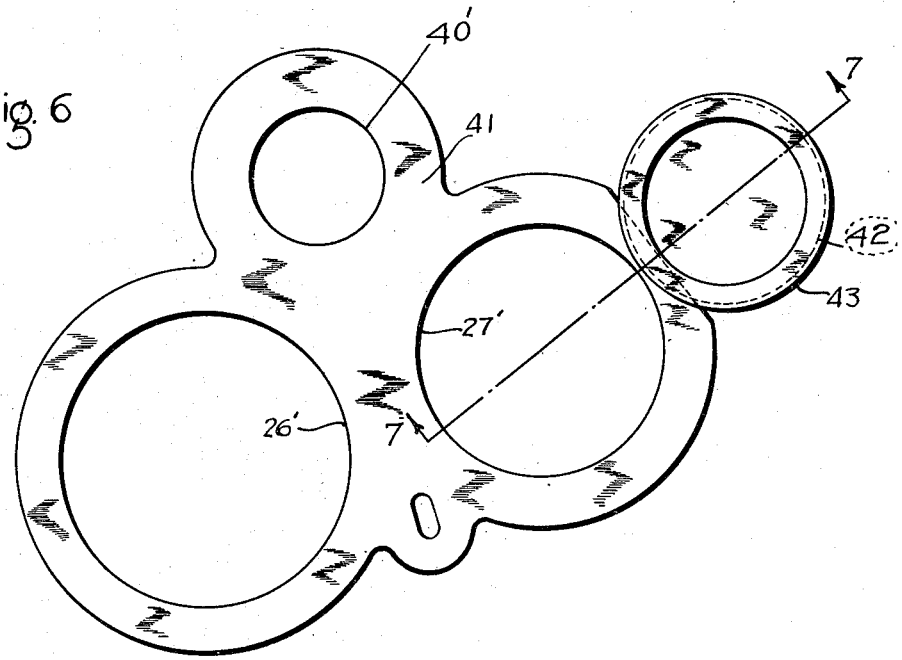
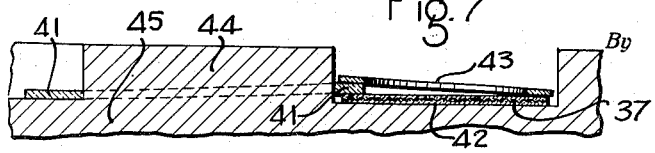
INVENTOR.
ELLIS E. HEWITT.
By Wm. M. Cady
ATTORNEY.

Patented Sept. 22, 1936

2,055,103

UNITED STATES PATENT OFFICE 2,055,103

GASKET AND METHOD OF MAKING

Ellis E. Hewitt, Edgewood, Pa., assignor to The Westinghouse Air Brake Company, Wilmerding, Pa., a corporation of Pennsylvania Application June 11, 1932, Serial No. 616,681

1 Claim. (Cl. 137—157)

This invention relates to gaskets and to a method of making gaskets, particularly for sealing a joint between two cooperating metal members such as the cylinder casing and cover of a fluid pressure brake controlling valve device.

An object of the invention is to provide a one piece gasket constituting a combined gasket and flexible diaphragm that may be effectively used to seal the joint between two casing members having metal to metal contact, and which may be confined in a groove or recess in a face of one of the metal members.

A further object of the invention is to provide a casing structure and a gasket structure therefor having the above noted characteristics, wherein the metal engaging marginal portions of the gaskets are made of relatively hard yielding material, such as rubber or composition, and the diaphragm portion thereof is made of relatively soft flexible material, such as rubber integrally joined to the harder marginal portion, and wherein the marginal portion of the gasket structure is provided with sealing ribs adapted to be pressed into the body of the structure by the casing for effecting a tight seal between the members of the casing structure.

A further object of the invention is to provide a gasket having integrally joined relatively hard and soft portions and a simple and inexpensive method of producing the gasket.

These and other objects of the invention that will be made apparent through the further description thereof, are attained by means of the casing and gasket structures and the method of making the gasket structure hereinafter described and illustrated in the accompanying drawings; wherein Fig. 1 is a sectional view of a casing structure and gasket structure taken on the line 1—1 of Fig. 2 and embodying features of the invention.

Fig. 4 is an elevational view of an improved gasket structure embodying features of the invention.

Fig. 5 is a section taken on the line 5—5 of Fig. 4.

Fig. 6 is an elevational view showing the blanks and their arrangement prior to the molding and vulcanizing operations used in the manufacture of the improved gasket structure.

Fig. 7 is a sectional view of the blanks and a fragment of the mold for forming the gasket structure, the section of the blanks being taken on line 7—7 of Fig. 6.

Figure 1:
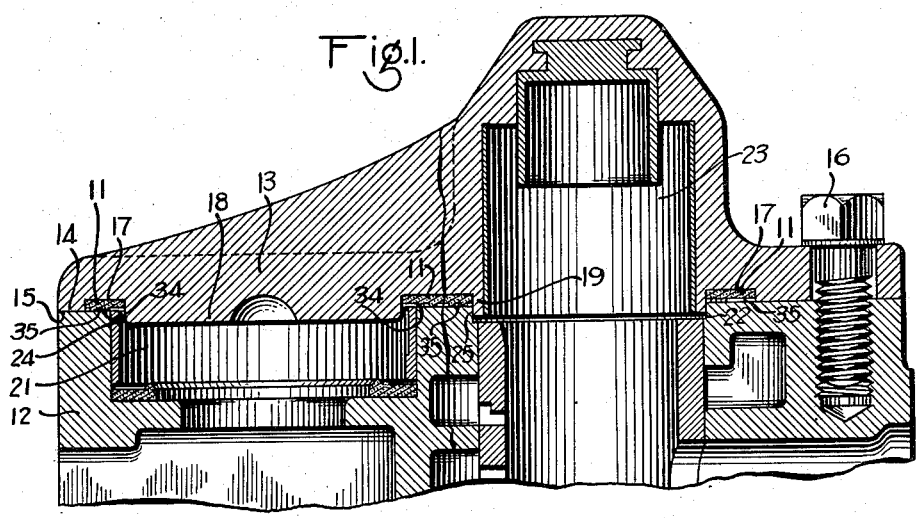

Referring to the drawings, and particularly to Figs. 1 and 4, the gasket structure 11 is shown in sealing position, wherein it is clamped between a cylinder casing member 12 and a cover or head member 13 having flat contact faces 14 and 15 respectively, that are drawn into metal to metal contact by means of a plurality of bolts 16; one of which is shown.

Figure 2:
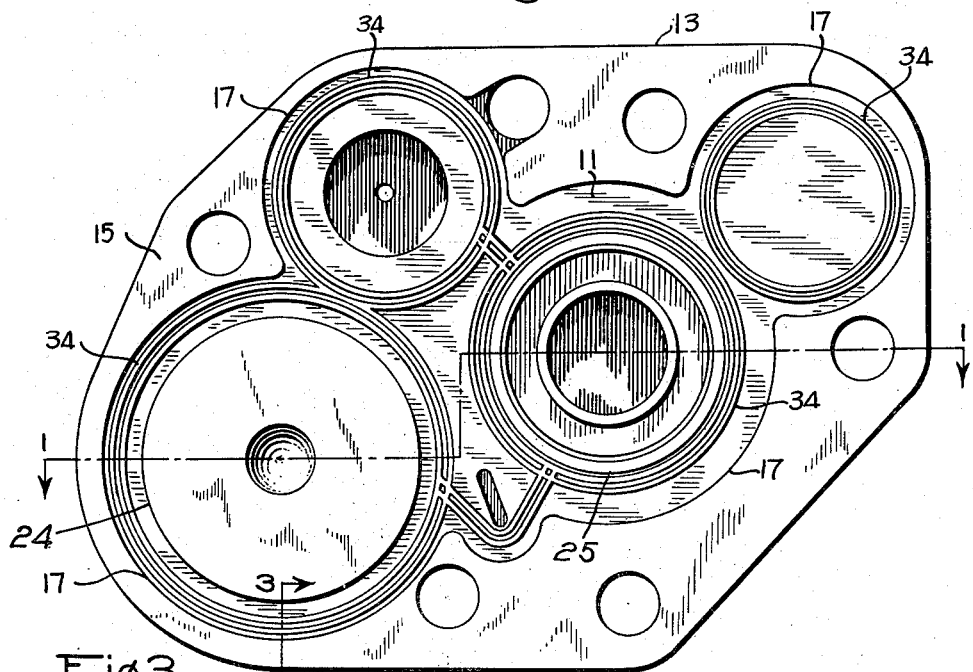
Fig. 2 is an elevational view of a head or cover member of the casing structure shown in Fig. 1, with an improved gasket structure mounted therein.

As indicated in Figs. 1 and 2, the cover or head 13 is provided with a recess 17 of irregular contour and having a flat bottom face, which is adapted to support the inner face of the gasket structure 11. The cover or head 13 is also provided with circular projections 18 and 19 that extend beyond the contact face 15 and into a chamber 21 and a shallow recess 22, respectively, in the casing 12 as indicated in Fig. 1. The projection 19 surrounds a chamber 23 in the cover or head 13 and snugly fits within the recess 22 and serves as a centering member for properly centering the head member upon the casing 12 during the assembly operation. The circular walls 24 and 25 of the projections 18 and 19 constitute confining walls for the portions of the gasket surrounding the openings 26 and 27 in the gasket structure 11, Fig. 4.

By reference to Fig. 4 it will be seen that the gasket structure 11 comprises a plurality of annular portions 28, 29 and 31 and a circular portion 32, integrally joined to constitute a single one piece combined gasket and diaphragm structure, the annular portions 28, 29, and 31 and the marginal portion 33 of the circular diaphragm portion 32 being adapted to be clamped between the casing and cover members 12 and 13 respectively, for sealing the joint between said members.

Figure 3:
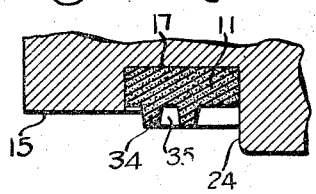
Fig. 3 is a sectional view of a fragment of the structure shown in Fig. 2, the section being taken on the line 3—3 of Fig. 2.

The annular portions 28, 29, and 31 and the marginal portion 33 of the diaphragm portion 32 are made of relatively hard yielding material, such as semi-hard rubber, and the said portions are provided with circular sealing ribs 34 disposed as shown in Figs. 2 and 4 and which extend above the flat surface of the gasket structure, and when the gasket structure is in operative position within the groove or recess 17, the ribs 34 extend beyond the contact face 15 of the cover or head 13 as shown in Fig. 3, so that when the cover is clamped in operative metal to metal contact with the casing 12 as indicated in Fig. 1, the ribs are pressed into the body of the gasket structure. Rubber or composition is substantially incompressible and consequently when the contact ribs 34 are pressed inwardly by the contact face 14 of the casing structure 12 with which they are engaged, the material in the body of the gasket structure which is confined between the outer side walls of the recess 17 and the circular walls 24 and 25 of the projections 18 and 19, flows outwardly toward the contact face 14 of the casing 12. For this reason, the thickness of the gasket structure is made less than the depth of the recess 17, thereby providing a space 35 between the outer face of the gasket and the contact face 14 of the casing member into which the material of the gasket may flow, when the sealing ribs 34 are pressed into the body of the gasket structure. Relatively great pressure is required to press the sealing ribs 34 into the body of the structure and consequently an effective seal is effected.

It has been found that fluid-tight joints without gaskets may be produced by a metal to metal contact of the casing and cover members but unless the surfaces are carefully machined and ground, slight leakage is liable to occur. A metal to metal joint, however, in certain cases is highly desirable, as in the present instance, for insuring that the head be disposed in a predetermined position with respect to the casing in order that a predetermined volume be maintained in the chamber closed by the head. Where a gasket alone is relied upon to seal the joint between the casing and the cover, the position of the cover is dependent upon the degree of compression of the gasket. Furthermore, it has been found that where the cover is drawn tightly into contact with the body of the gasket in the endeavor to obtain a fluid-tight seal, the gasket is liable to flow and squeeze out of the space between the casing and the cover, and in the case where a diaphragm is clamped between the metal members, the diaphragm is distorted by the flow of gasket material from between the contacting surfaces of the metal members.

Heretofore, where metal contacts were employed to provide a fluid-tight joint, it was not practical to use a yielding packing material where it would be confined as in the present instance because of the liability of the packing material to flow into the space between the contacting surfaces while the casing parts are being drawn together, thereby preventing actual metal to metal contact of the parts and improper sealing of the cover upon the casing. By using a gasket, the thickness of which is less than the depth of the groove in which it is mounted, and having sealing ribs thereon which are adapted to be compressed into the body of the gasket structure, spaces are provided for the flow of the gasket material as the sealing ribs are pressed into the body of the gasket structure and consequently the gasket cannot interfere with the proper positioning of the cover upon the casing in metal to metal contact. A double seal is, therefore, provided by the gasket and the metal to metal contacting surfaces. Thus a more efficient seal is provided between the cover and the casing.

The provision of sealing ribs is particularly desirable in case of a diaphragm constituting part of the sealing gasket. It has been found that compression of the marginal portion of the usual diaphragm between two metal surfaces causes the material of the margin to flow toward the center or toward the diaphragm and to cause it to buckle. By using sealing ribs as described above, the flow is localized in the vicinity of the sealing ribs and confined to the space between the gasket and the contact faces of the metal member. Consequently there is no tendency for the material in the margin of the diaphragm to flow radially inwardly and cause distortion of the diaphragm.

In order to obtain an effective seal, it has been found that the margin of the gasket that is clamped between the metal members should be made of material that is relatively hard, but which will yield when the metal parts are drawn into engagement. This material does not have sufficient flexibility for use as a diaphragm. Accordingly, the diaphragm portion of the gasket is made of a soft rubber of the required flexibility, which is joined integrally to the relatively hard marginal portion 33 during the vulcanizing operation while forming the gasket within a suitable mold.

By reference to Fig. 5, it will be seen that the diaphragm portion 32 of the gasket structure comprises a central portion 36 that is made of relatively soft flexible rubber in which the reinforcing fabric 37 is embedded. The outer face of the marginal portion 33 of the diaphragm portion 32 is made of substantially the same material as the annular portions 28, 29, and 31 of the gasket structure. Thus the outer contacting face of the entire gasket structure is of relatively hard material and the sealing ribs 34 are composed of the same hard material.

The gasket structure is manufactured by the following method:

A blank 41, having the general shape and contour of the annular portions 28, 29, and 31 of the finished gasket, is stamped from suitable raw sheet rubber of such composition that it will be relatively hard but yielding when vulcanized, the blank being provided with openings 26' and 27' corresponding to the openings 26 and 27 in the finished gasket and a third opening 40' corresponding to the opening 40 in the annular portion 31 of the finished gasket. To the underside of the blank 41, a circular blank 42 is attached which is made of raw sheet rubber of such composition that it will be relatively soft and flexible when vulcanized. A reinforcing fabric 37 is embedded in the blank 42 as shown ing Fig. 7. A third blank 43, which is annular in shape and which is stamped from raw sheet rubber similar to that of the blank 41 and which is of less thickness than the material of that blank, is attached as indicated in Figs. 6 and 7 to the upper side of the blank 41 and to the upper face of the blank 42, the blank 41 being disposed between the blank 43 and blank 42 as indicated in Fig. 7. The composite blank thus assembled is placed in a mold so that a projection 44 in the mold 45 extends through the opening 27', it being understood that the mold 45 is of the proper shape to produce the desired finished gasket structure as shown in Fig. 4.

The upper half of the mold, not shown, is then placed in registry with the mold section 45 and the mold sections are then forced together under high pressure, so as to force the raw rubber into the shape of the finished gasket structure, the excess rubber flowing from the mold through crevices (not shown) provided for that purpose. The mold is then subjected to heat and the temperature is maintained at substantially 300 degrees F. for approximately 50 minutes. The finished gasket is then removed from the mold.

The distribution of the soft rubber portion of the diaphragm is substantially as indicated in Fig. 5, and the sealing ribs 34 on the annular portions 28, 29, and 31 and on the marginal portion of the diaphragm portion 32 consist of the relatively hard material. Therefore, the sealing ribs engage the contact face 14 of the casing 12 with uniform pressure throughout. During the vulcanizing process the three blanks of raw material are integrally joined to one another and constitute a one piece gasket structure having annular gasket portions and a circular diaphragm portion in which a diaphragm of relatively soft rubber is provided surrounded by a marginal portion of relatively hard rubber.

While I have disclosed but one embodiment of the invention and but one method of manufacture, it is obvious that changes may be made in the structure, and in the method of manufacture without departing from the spirit of the invention.

Having now described my invention, what I claim as new and desire to secure by Letters Patent, is:

A composite gasket and diaphragm of rubber material comprising a diaphragm portion which is relatively soft and flexible in its vulcanized state and, surrounding the peripheral edge of and integrally joined to the diaphragm portion, a gasket portion which is relatively hard and less flexible in its vulcanized state compared to the diaphragm portion, the opposite faces of the gasket portion being sealing faces and the thickness of the gasket portion between the sealing faces being greater than the thickness of the diaphragm portion so that the gasket portion assumes the clamping force and resists distortion of the diaphragm portion due to the clamping force.

ELLIS E. HEWITT.